(12) United States Patent
Freedman

(10) Patent No.: US 6,242,893 B1
(45) Date of Patent: Jun. 5, 2001

(54) LITHIUM-ION AND LITHIUM POLYMER BATTERY RECHARGING

(75) Inventor: Robert P. Freedman, Huntington, NY (US)

(73) Assignee: Bren-Tronics, Inc., Commack, NY (US)

( * ) Notice: Subject to any disclaimer, the term of this patent is extended or adjusted under 35 U.S.C. 154(b) by 0 days.

(21) Appl. No.: 09/339,452

(22) Filed: Jun. 24, 1999

(51) Int. Cl.[7] .................................................. H02J 7/00
(52) U.S. Cl. .............................................. 320/135; 320/136
(58) Field of Search ............................... 320/135, 132, 320/134, 136, 143

(56) References Cited

U.S. PATENT DOCUMENTS

| | | | | |
|---|---|---|---|---|
| 4,242,627 | * | 12/1980 | Kisiel ............................... | 320/143 |
| 5,420,493 | * | 5/1995 | Hargadon et al. .................. | 320/106 |
| 5,432,429 | * | 7/1995 | Armstrong, II et al. ........... | 320/136 |
| 5,631,537 | * | 5/1997 | Armstrong ......................... | 320/118 |
| 5,644,209 | * | 7/1997 | Chabbert et al. .................. | 320/122 |
| 5,646,504 | * | 7/1997 | Feldstein ........................... | 320/118 |
| 5,861,812 | * | 1/1999 | Mitchell et al. ................... | 340/636 |
| 5,864,220 | * | 1/1999 | Reipur et al. ...................... | 320/134 |
| 5,994,878 | * | 11/1999 | Ostergaard et al. ............... | 320/132 |
| 5,998,974 | * | 12/1999 | Sudo et al. ........................ | 320/136 |
| 6,020,722 | * | 2/2000 | Freiman ............................. | 320/134 |

OTHER PUBLICATIONS

Texas Instruments Bulletin "bq2056/T/V", "Low dropout Li–ion charge control IC's with autocomp charge rate compensation", pp. 1–12, Oct. 1998.*

Texas Instruments Bulletin "BENCHMARK—Using the bq2058", "Improving immunity to false overcurrent shutdown", pp. 1–6, Oct. 1998.*

* cited by examiner

Primary Examiner—Peter S. Wong
Assistant Examiner—Pia Tibbits
(74) Attorney, Agent, or Firm—Greenberg Traurig LLP

(57) ABSTRACT

A safety circuit for lithium-ion and lithium polymer cells which provides for greater accuracy in control of the limiting voltages and currents during discharging and recharging and which includes recognition circuitry to determine presence of a particular battery type. MOSFETS, normally used to provide charge limiting voltages, in recharging cells or batteries but which are relatively imprecise, are removed from the circuit to the extent that they are not used in the measurement of current for control purposes. The function of current limit determinations is instead provided by highly accurate resistive elements.

10 Claims, 2 Drawing Sheets

LITHIUM-ION AND LITHIUM POLYMER BATTERY RECHARGING

FIELD OF THE INVENTION

Figure 1:
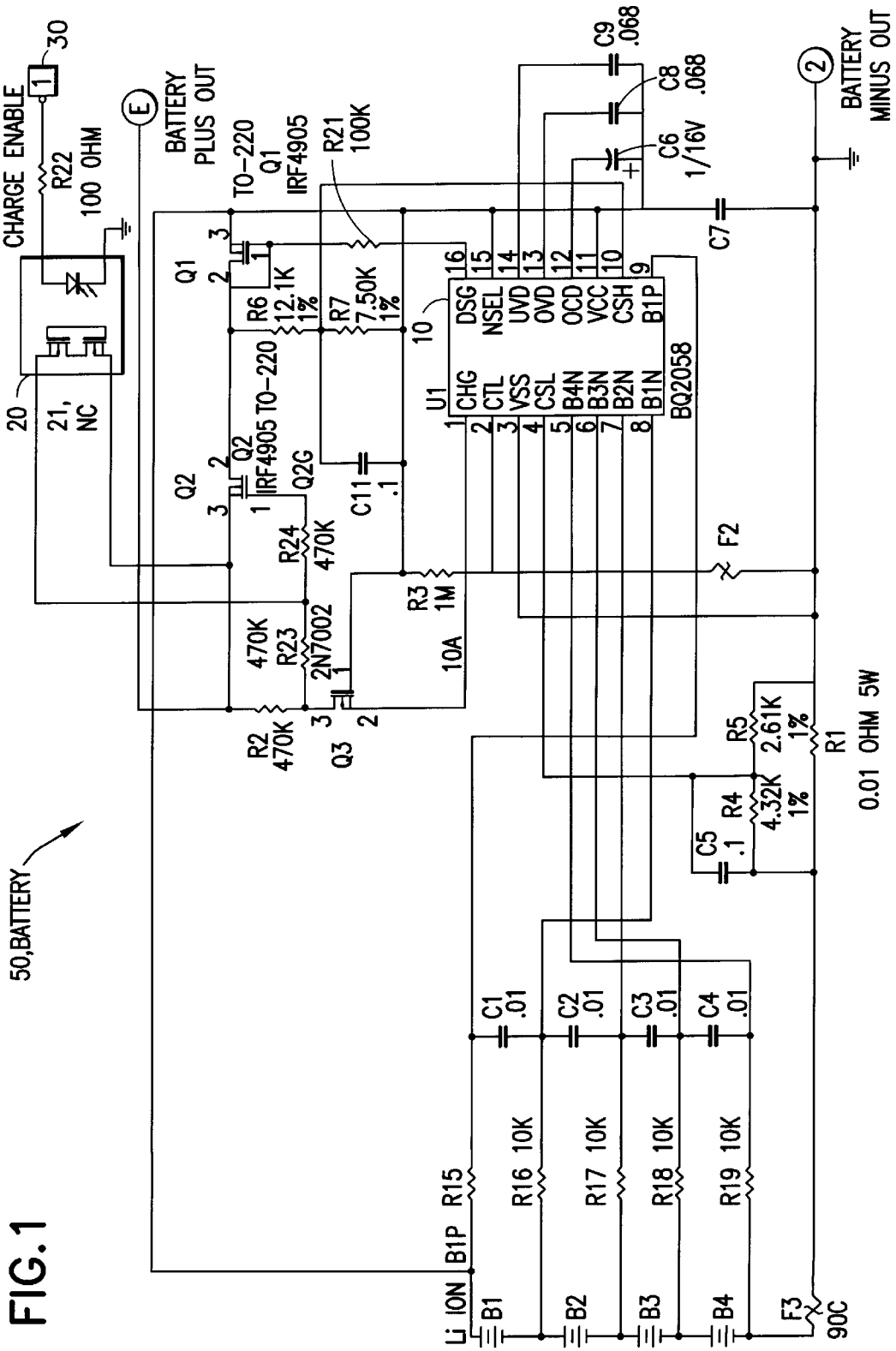

This invention relates to safety measures and circuits used with respect to the recharging of relatively powerful and high voltage lithium-ion, lithium polymer and similar type cells and batteries.

BACKGROUND OF THE INVENTION

The development of new battery chemistries, and particularly the commercial development of high capacity and high rate lithium cells, has increased the performance potential of both primary and secondary cells. These new cells tend to have more capacity per unit volume or weight (this is in part attributable to lithium being a light weight material with a very high capacity to weight ratio), or both. However, as a result of the chemistry involved, operating requirements of such cells must be more closely monitored and controlled, especially if rapid charging or discharging is needed.

Failure to observe safety precautions or to take into account different charging characteristics and requirements of such cells will, at the least, reduce the life of the battery and may cause it to overheat, vent, or leak electrolyte.

In addition, lithium batteries have the added potential for major physical damage because of the very high activity of the metal and some of its derivatives. Both users and manufacturers have already suffered extremely serious fires and explosions caused by various kinds of lithium cells, particularly under recharging conditions. Accordingly, charging conditions must be closely controlled to maintain both safety and optimal operation conditions.

Optimum performance of batteries in general is achieved when all cells in the battery are precisely balanced and are being charged and discharged in unison. Untoward events (leakage, venting, etc.) are avoided with such optimum performance conditions and safety is similarly not a problem. It is generally only when there is an imbalance in the system which cause the various untoward events. Though it is possible to overcompensate for the imbalances to ensure safety this is at a major cost of a reduction in cell capacity and performance.

In order to maintain optimum performance conditions it is important to initially determine normal discharge and charging conditions and then to provide means to only permit operation within the normal range of conditions. Thus, in the case of lithium secondary cells, at significant discharge rates, it is hazardous to discharge any cell below a level of about 2.25 volts and it is also necessary to limit charge voltage to 4.24.4 volts per cell, with the variation being a function of construction of the cell. Precise monitoring and shut off circuitry is necessary to avoid the detrimental low voltage discharge and high voltage charging conditions.

Because lithium ion (Li-Ion) cells get very hot under extended (several minutes) discharge at rates well above 1.5 C, it is desirable to be able to limit discharge accurately and predictably to maximize cell performance without the necessity of an excessive cell safety factor. This permits batteries to be designed to meet maximum pulse load requirements without requiring a large 'tolerance window whereby the point where over-current protection begins can be set only slightly higher than the highest specified operating current.

Normally, the charging protocol for Li-Ion batteries is relatively simple. The charger is set to charge at a limited maximum rate (depending upon the cell size and arrangement), which changes to fixed voltage when the battery approaches the desired maximum voltage per cell, A good quality laboratory power supply can do this quite easily, and many older chargers are adjustable to accomplish this as well.

If, however, a Li-Ion battery is placed on a charger which is set for a higher terminal voltage than 4.25V per cell, or a higher than rated current, there is a real possibility of fire or explosion. Further, if the battery is connected to a load above its current capability, it will overheat, even if the cells are not taken below the minimum voltage of 2.25 volts/cell.

Prior art integrated circuits which monitor the individual cell voltages and open-circuit the battery when any cell reaches maximum or minimum voltage are known and are currently marketed. And many of these devices also provide overcurrent protection. However, these existing monitoring circuits and devices have limitations when they are applied to relatively large, high-performance batteries such as lithium-ion polymer batteries.

A problem with the prior art battery protection integrated circuits (ICs) is that they measure current by measuring the voltage drop across the transistors used for power switching, with the IC being designed to switch OFF the battery at a predetermined number of millivolts. The transistors are typically MOSFETs which behave characteristically like resistors in the conductive mode with the millivolt level being determined thereby.

However, MOSFET resistance values tend to vary from sample to sample even within type; and different types vary widely. Additionally, resistance increases with the operating temperature of the MOSFET. Thus, with MOSFETs used in cut-off and control circuitry, the actual current limit will vary from battery to battery because of MOSFET variations. It will change more radically if the MOSFET type is changed, and it will decrease as the operating temperature increases. As a result, battery designers, faced with requirements to meet current drains which approach maximum for the cells, must allow for MOSFET variations (including expected temperature conditions of usage) and are therefore precluded from using the full capability of the cells.

SUMMARY OF THE INVENTION

It is an object of the invention to provide monitoring and control means for battery voltage and particularly high capacity and performance lithium batteries, to permit higher capacity usage without compromising safety.

It is a further object of the present invention to provide such monitoring and control means which is uniform and relatively temperature independent and which is effectively utilizable under conditions of charging and discharging.

Generally, the present invention comprises resistive means for accurately and consistently monitoring discharge and charging voltages and currents to predetermined parameters whereby circuit controls are accurately deployed during charging and discharging modes to provide safety cutoffs of both discharge and charge at relatively precise levels. In accordance with a preferred embodiment of the present invention there is a secondary initial charge control means which provides a recognition acknowledgement of a proper battery for charging before allowing the charging circuit to be initially activated in order to prevent potentially dangerous charging of lithium batteries with charging methods suitable for batteries of similar physical characteristics but different electrochemical properties.

The above and other objects, features and advantages of the present invention will become more evident from the following discussion and drawings in which:

SHORT DESCRIPTION OF THE DRAWINGS

Figure 1A:
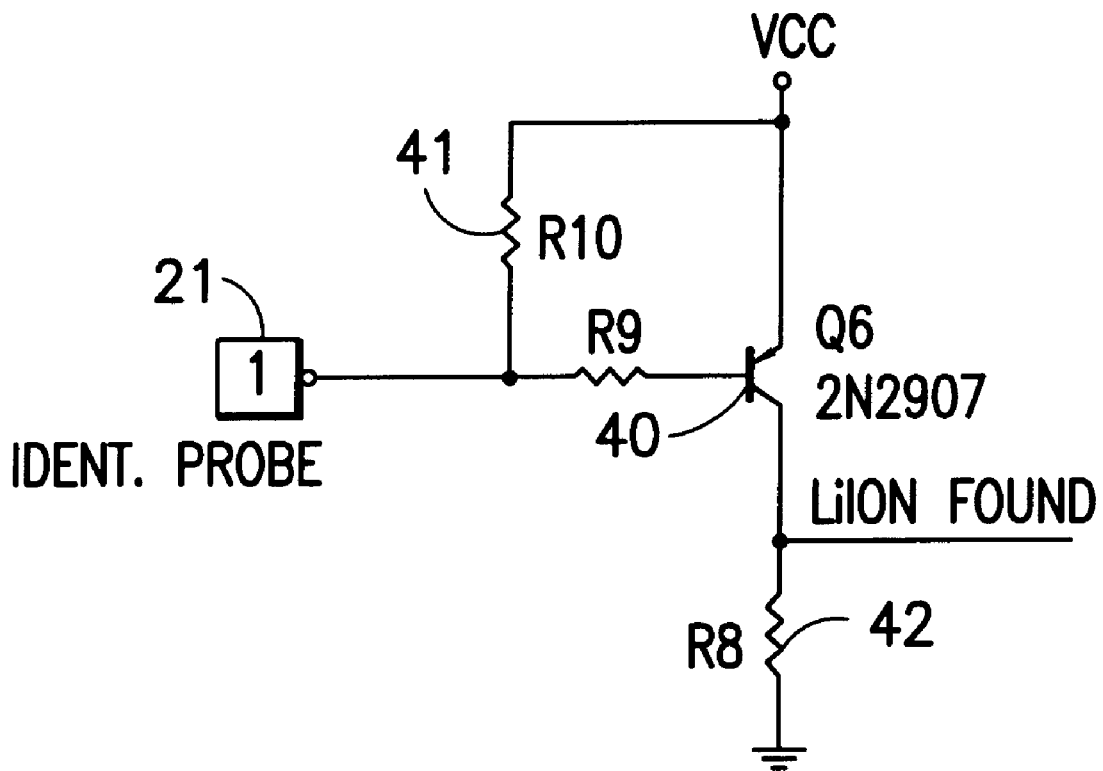

FIG. 1 is a circuit diagram of the circuit monitoring and cut off control with the accurate and consistent voltage and current measurement in accordance with the present invention; and FIG. 1A is a circuit diagram showing the handshaking protocol circuit which ensures that both the battery and charger are compatible before charging is enabled.

DETAILED DESCRIPTION OF THE INVENTION

In accordance with the present invention there is an enhanced accuracy of voltage monitoring for controlling both the discharge current and voltage and the charging of rechargeable batteries containing series cells and particularly lithium-ion or lithium polymer cells at predetermined safe current and voltage limits.

The battery is provided with IC voltage and current control means which is positioned in the battery circuit and set to ) interrupt the discharge and charging circuit at predetermined voltages. MOSFET elements of the prior art which perform the function of current monitoring are removed from the direct current monitoring function which they perform in prior art systems, such as in systems which use the Benchmarq BQ2058 IC. This prior art circuit is designed to be used either with P-channel MOSFETs in the positive (high) side or N-channel MOSFETs in the negative (low) side and accordingly, there is current sensing in both the high and low sides. In the application of monitoring of charging conditions, the logic of the IC requires that there be a small voltage differential between battery and charger on the high side in order for charging to be allowed. This requires the placement of two MOSFETs in the high side, To control charge and discharge, whereas, in the prior art, the voltage between the sources of these MOSFET's is measured by the IC to validate the charge voltage and also to serve as a coarse indication of current flow, the controlling current measure. In accordance with the present invention, instead of taking these points (from the voltage sources to the MOSFETs) directly to high current sensing means, a voltage divider is formed by two resistors across only one of the MOSFETS, whose junction is connected to high current sensing means, to provide the voltage needed to allow charging to begin. However, this is insufficient to signal current limit at any current in the desired range. Accordingly, a precision metallic or wire wound resistor is provided in the circuit of the low-side current sensing means whereby the voltage thereacross is used as an accurate measure of the current being drawn. A voltage divider formed by two additional resistors makes it possible to chose the current limit precisely. With 1% tolerance resistors commonly available, this limit is accurate to the tolerance of the IC, about ±20% of full scale, thereby providing a vast improvement over the conventional method of voltage and current control.

Although the protection IC such as the Benchmarq BQ2058 IC is designed to shut OFF one or both of the MOSFETs when overcharge or overdischarge is detected at any cell, the potential hazard of incorrect charging makes it important to take additional precautions. Thus, many new batteries are replacements in device applications such as radios which have used a wide range of primary and secondary cell types over the years, with all such batteries being physically very similar, e.g., with the same case and the same connector. As a result, the probability of improper charging through operator error or improper charger set-up is very high.

Thus, in accordance with a preferred embodiment of the present invention, in addition to the circuit of the present invention, described above, there is provided circuit control battery recognition means, which prevents charging under any circumstances unless the charger proves that it recognizes this unique battery. In such embodiment an optoisolator is connected as a normally-open switch in series with the charge lead of the current control IC. Until current is drawn by an LED in the optoisolator, the switch is held open, and the IC cannot enable one of the MOSFETs to turn ON, thereby disabling any charging. Recognition of the particular battery to be charged by the circuit, adapted to the characteristics of the battery, causes the switch to close and charging to proceed.

In a preferred embodiment, the IDENT port of the battery being charged is extended to a terminal on the battery case. In a charger adapted for this identifications a mating contact is provided for connection therewith. The charger monitors a line, which is low when no Li-Ion battery is present. When a qualified battery is connected, current is drawn through a resistor and thence through the LEDs in the optoisolator. This current lowers the base voltage of a PNP transistor, current flows into the collector resistor and the line goes high, identifying the battery to the charger. Once the optoisolator is energized, the charge MOSFET is enabled and turned on to permit the charging.

DETAILED DESCRIPTION OF THE DRAWING AND THE PREFERRED EMBODIMENT

With reference to the drawings in FIG. 1, Benchmarq BQ2058 IC 10 provides the logic for monitoring and controlling current at predetermined voltages and currents. IC 10 is designed to be used either with P-channel MOSFETs in the positive (high) side or N-channel MOSFETs in the negative (low) side. Accordingly, there is current sensing in both the high and low sides. As shown, the logic of the IC requires that there be a small voltage differential between battery and charger on the high side in order for charging to be allowed. Accordingly, MOSFETs, Q1 and Q2, are placed in the high side., a voltage divider is formed by resistors R6 and R7 across MOSFET Q1 only, whose junction is connected to CSH (Current Sense, High) of IC 10. This provides the voltage needed to allow charging to begin, but is insufficient to signal current limit at any current in the desired range.

The voltage across precision metallic or wire-wound resistor R1 is an accurate measure of the current being drawn. Resistors R4 and R5 are a voltage divider making it possible to choose the current limit precisely.

Addition of a circuit which prevents charging under any circumstances unless the charger proves that it recognizes this unique battery is shown in FIG. 2, wherein optoisolator 20, with transistor Q3, is connected as a normally-open switch 21 (Form A) in series with the Charge (CHG) lead 10a of the IC 10. Until current is drawn by an LED in the optoisolator, the switch 21 is held open, and the IC 10 cannot enable MOSFET Q2 to turn ON via Q3, and charging is not possible.

The IDENT port 30 of the battery 50 is brought out to a terminal on the battery case. In a charger adapted to this scheme there is a mating contact and a transistor circuit as shown. The charger monitors the line 100, which is low when no Li-Ion battery is present. When a qualified battery is connected, current is drawn from Vcc 60 through a 270 ohm resistor 41, and thence through the LEDs in the optoisolator 20. This current lowers the base voltage of the PNP transistor 40, current flows into the collector resistor 42 and the LI-ION line goes high to identify the battery to the charger. At the same time, the LED in the optoisolator 20 turns ON the charge MOSFET Q2.

It is understood that the above discussion and drawings are only exemplary of the present invention and that changes in structure, components, circuitry and the like are possible without departing from the scope of the present invention as defined in the following claims.

What is claimed is:

1. A battery charger having a safety device for controlling charging and discharging of one or more electrochemical cells, the safety device comprising:
    a battery circuit having a high side and a low side, configured and adapted for placement of at least one electrochemical cell between the high side and the low side for charging and/or discharging of the cell;
    an integrated circuit positioned in the battery circuit for controlling voltage and current, the integrated circuit having a high side current sensor and a low side current sensor, wherein the integrated circuit is set to interrupt charging at a first predetermined current that is proportional to a first predetermined voltage, and to interrupt discharging at a second predetermined current that is proportional to a second predetermined voltage;
    a first resistor in the low side of the battery circuit; and
    first means for measuring a first resistor current through the first resistor, the current measuring means connected to the low side current sensor; wherein
    during the charging or discharging of one or more electrochemical cells, a first resistor voltage exists across the first resistor, resulting in the first resistor current, proportional to the first resistor voltage, and wherein the first resistor current is detected by the low side current sensor, such that if the first voltage and resulting first current exceed predetermined values, the integrated circuit interrupts the charging or discharging of the one or more cells.

2. The battery charger of claim 1, wherein the first means for measuring the first resistor current comprises a first voltage divider across the first resistor, the first voltage divider comprising a second resistor and a third resistor and a first voltage divider junction connecting the second resistor to the third resistor, wherein the first voltage divider junction is connected to the low side current sensor of the integrated circuit, such that the a first voltage divider current proportional to the first resistor current flows through the first voltage divider junction, and is detected by the low side current sensor.

3. The battery charger of claim 1, wherein the first resistor is a precision resistor.

4. The battery charger of claim 1, further comprising two MOSFETs in the high side of the battery circuit and a second voltage divider across one of the MOSFETs, the second voltage divider comprising a fourth resistor and a fifth resistor and a second voltage divider junction connecting the fourth and fifth resistors, the second voltage divider junction connected to the high side current sensor of the integrated circuit to allow charging of one or more electrochemical cells.

5. The battery charger of claim 1, wherein the safety device is adapted for controlling charging and discharging at least one of lithium-ion and lithium polymer cells.

6. The battery charger of claim 5, wherein the safety device further comprises an initial charge controller, providing recognition acknowledgement of a proper battery for charging before allowing the battery circuit to be activated for charging, thereby preventing charging of cells having similar physical characteristics to lithium-ion and lithium polymer cells, but different electrochemical properties.

7. The battery charger of claim 6, wherein the safety device further comprises circuit control cell recognition means to prevent charging of a cell unless the recognition means recognizes the cell, the cell recognition means comprising an optoisolator comprising an LED, the optoisolator connected in series with a charge lead of the integrated circuit as a normally-closed switch, wherein the optoisolator switch is held closed until current is drawn by an LED in the optoisolator, thereby preventing the integrated circuit from enabling one of the MOSFETs to turn ON, disabling charging, and wherein recognition of a cell to be charged by the circuit closes the switch, allowing charging to proceed.

8. The battery charger of claim 7, wherein the charger is adapted to monitor a line that is low when a lithium-ion or lithium polymer battery is not present, and the cell recognition means is adapted to provide a mating contact to a terminal on a case for the cell connected to a port on at least one cell to be charged, such that when a lithium-ion or lithium polymer cell case is placed in the charger a current is drawn through a resistor and the LED in the optoisolator, the current through the resistor causing the line to go high, causing the line to go high, and energizing the optoisolator to turn on a charge MOSFET, enabling charging.

9. A method for controlling charging or discharging at least one electrochemical cell, the method comprising:
    providing a charger in accordance with claim 1;
    determining a maximum charging current value, a maximum charging voltage value, a maximum discharge current value, and a minimum discharge voltage value for the cell;
    setting the integrated circuit to interrupt charging and discharging at the determined voltages;
    placing at least one cell between the high side and the low side of the batter circuit; and charging or discharging the cell.

10. The method of claim 9, further comprising setting the maximum charging voltage at from about 4.2 to about 4.4 volts, and setting the minimum discharge voltage to from about 2 to about 2.25 volts.

\* \* \* \* \*